United States Patent Office 2,886,614
Patented May 12, 1959

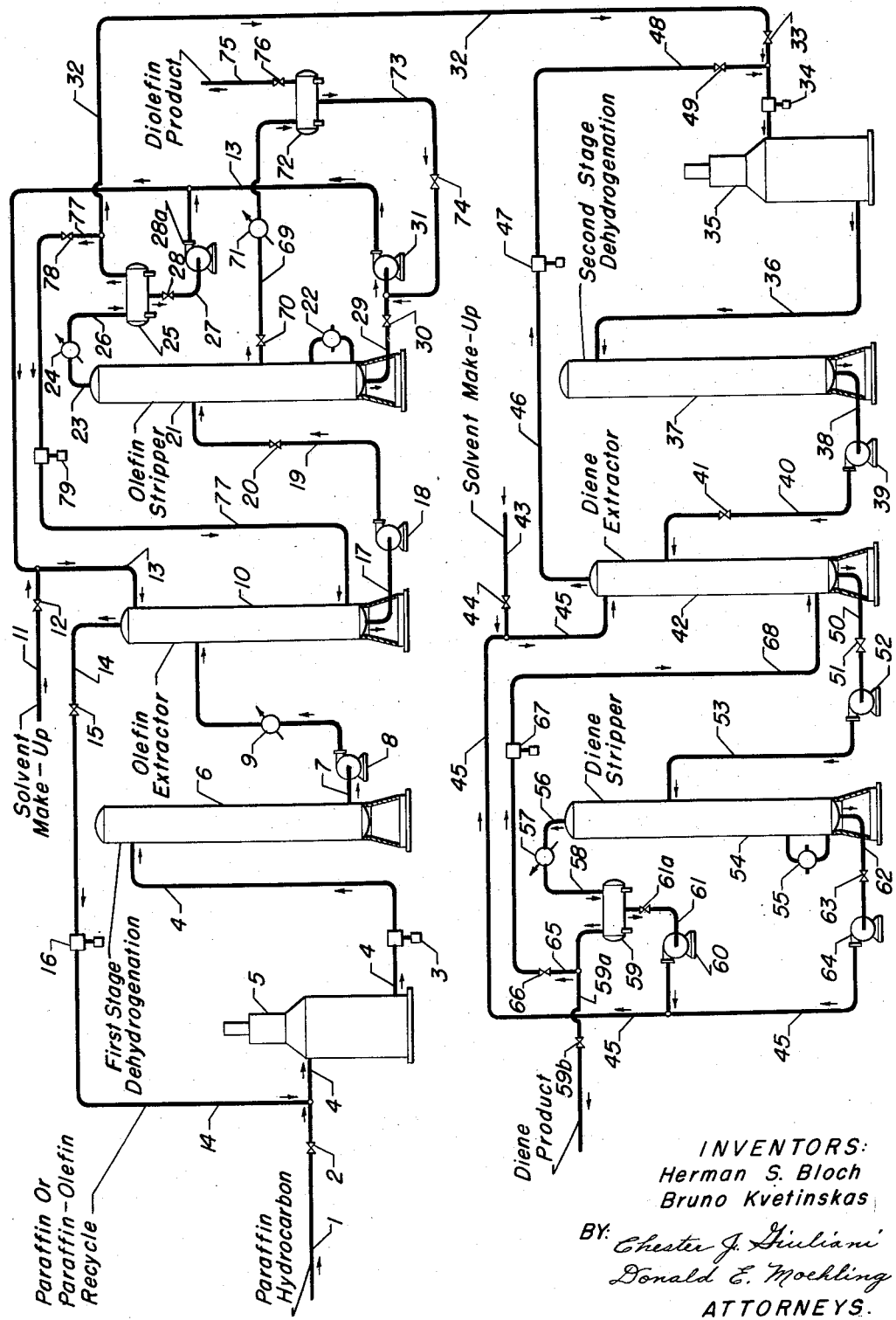

2,886,614

PRODUCTION AND RECOVERY OF UNSATURATED HYDROCARBONS EMPLOYING ADIPONITRILE CONTAINING SOLVENT

Herman S. Bloch, Skokie, and Bruno Kvetinskas, Chicago, Ill., assignors to Universal Oil Products Company, Des Plaines, Ill., a corporation of Delaware Application October 17, 1956, Serial No. 616,454

12 Claims. (Cl. 260—680)

This invention relates to a process for converting paraffinic hydrocarbons into their corresponding olefin and di-olefin analogs and to a process for the separation of the dehydrogenated products from the starting material or unsaturated intermediates formed during one or more stages of the process. In its more specific aspects, the present invention relates to a combination dehydrogenation-solvent extraction process for the production of dienic hydrocarbons wherein the paraffin analog of the desired product is subjected to a first-stage dehydrogenation reaction to form a product containing olefinic hydrocarbons, the resulting mixture is subjected to solvent extraction to separate a paraffin recycle stream from an intermediate olefin stream, and the latter intermediate olefin is further dehydrogenated to form a diene-olefin mixture which is subjected to solvent extraction to separate an olefin recycle stream and a diene hydrocarbon product, in each of the solvent extraction stages a solvent composition comprising water, adiponitrile and an organic oxygen-containing, water soluble compound being utilized as extractive solvent.

Mono-olefins and di-olefins constitute one of the principal raw materials in the synthetic organic chemical industry and the demand for these hydrocarbons steadily increases as the market for products derived from the mono- and di-olefins grows. Thus, the production of synthetic elastomers, in many cases demands the consumption of butadiene in a substantially pure form and in large quantities, the demand steadily increasing as more varied uses are found for synthetic rubbers. Similarly, in the production of insecticides, large quantities of cyclopentadiene are utilized and generally the cyclopentadiene for such use must likewise be in substantially pure form in order to obtain the desired end product. The use of hexadienes, as well as butadienes and pentadienes in the plastics, resin, drying oil and synthetic fiber industries is well known and in each case the dienes charged to the various processes are generally required in a purity which approaches 100% diene content in order to yield a product meeting process specifications.

The present process provides a combined dehydrogenation-solvent extraction process for the manufacture of dienes in substantially pure form, starting with either the mono-olefin or the corresponding naphthene or paraffin and employing a highly efficient and effective means for manufacturing the diene product in essentially 100% purity. The solvent utilized in the extraction stage of the process is highly selective for the more unsaturated analog contained in the mixture of hydrocarbons while, at the same time, having a relatively high solubility for the indicated more unsaturated analog.

In one of its embodiments, the present invention relates to a process for converting a paraffinic hydrocarbon containing from 4 to 6 carbon atoms into a diene of the same carbon atom content which comprises subjecting said paraffinic hydrocarbon to a first dehydrogenation reaction at conditions sufficient to convert at least a portion of the paraffin into a mono-olefin of the same carbon atom content, contacting the resulting olefin-containing hydrocarbon mixture with a solvent in which said olefin is selectively soluble, comprising from 0% to about 20% by weight of water, from 15% to about 40% by weight of adiponitrile and the remainder an oxygen-containing, water-soluble organic compound having a boiling point not substantially in excess of about 212° F., separating unconverted paraffin as raffinate from a rich solvent stream containing dissolved mono-olefin, recovering said mono-olefin from said rich solvent, recycling said paraffinic raffinate to the first dehydrogenation step, subjecting said recovered olefin to a second dehydrogenation at reaction conditions sufficient to convert at least a portion of said mono-olefin to said diene hydrocarbon of the same carbon atom content, contacting the resulting diene-containing hydrocarbon with a second solvent in which said diene is selectively soluble, comprising the aforementioned solvent but of higher water content, separating unconverted olefin as raffinate from a rich solvent containing dissolved diene, recovering said diene from said rich solvent and recycling said olefin to said second dehydrogenation step.

A more specific embodiment of the invention relates to the process of the above embodiment further characterized in that said organic solvent is methanol, said rich solvent is subjected to extractive distillation to recover the hydrocarbon solute, and the relative proportion of said methanol, water and adiponitrile in the solvent composition is adjusted to provide a ternary composition having a boiling point approximately equal to the rich solvent extractive distillation temperature.

The combined dehydrogenation-solvent extraction process of this invention may be employed for the ultimate conversion of a paraffinic hydrocarbon to its diene analog or the conversion may be interrupted at the intermediate stage to recover a substantially pure mono-olefin hydrocarbon product and in a further modification, the starting material may be a mixture of mono-olefin and paraffin or the mono-olefin exclusively for conversion to the diene of the same carbon atom content. The types of hydrocarbons utilizable as feed stocks may range from aliphatic paraffins and mono-olefins to cyclic paraffins (naphthenes) and olefins containing from 4 to 6 carbon atoms per molecule, inclusive, as well as to mixtures containing one or more of the individual mono- or di-olefin $C_4$–$C_6$ hydrocarbons of aliphatic or cyclic structure. Thus, in many petroleum refining processes, a portion of the feed stock is normally converted to a gaseous by-product, due to cracking of the hydrocarbons charged to the process. These normally gaseous hydrocarbons may contain an appreciable proportion of methane, ethane, ethylene, propane, propylene, butanes and butenes and relatively minor proportions of $C_5$ and $C_6$ paraffins and mono-olefins, the $C_6$ and higher homologs generally appearing in the separately recovered liquid product of the process, generally utilized as a liquid fuel. In most refining operations, the normally gaseous product is compressed and cooled to separate a liquefied fraction containing $C_4$–$C_6$ hydrocarbons from the lower molecular weight and noncondensable gases such as hydrogen, carbon monoxide, etc. One of the principal sources of $C_4$ hydrocarbons is the latter condensate recovered from the by-product gaseous fraction of refining operations. This product generally contains normal and isobutane as well as the butene isomers and a small proportion of $C_5$ and $C_6$ paraffins, olefins and naphthenes. Such by-product fractions may be utilized as the feed stock in the present process or a pure, specific hydrocarbon may be preferred in order to produce a relatively pure product. Thus, the aforementioned $C_4$–$C_6$ hydrocarbon mixture may be fractionated to recover any one or more of the individual components and the latter charged to the present process; in other instances the products of other processes such as Fischer-Tropsch synthesis products may be utilized as feed stocks herein. In one of its most useful and preferred applications, the present invention is directed to the production of butadiene from a butane or a butene or mixed butane-butene feed stock, because of the magnitude of the problem of separating these closely boiling hydrocarbons from a mixture of the same.

The solvent utilized herein is a multi-component mixture of organic compounds which selectively dissolves unsaturated hydrocarbons from mixtures of saturated and unsaturated hydrocarbons. It has been found that a solvent composition containing adiponitrile, an oxygen-containing organic compound soluble in water and having a boiling point at or below the boiling point of water and from about 0 to about 20% by weight of water constitutes a solvent composition having a high degree of selectivity for mono-olefins over paraffins and di-olefins over mono-olefins in the present type of extraction process, accomplished by a suitable adjustment in the solvent composition and/or extraction conditions, depending upon the particular separation desired. The water-soluble organic compound having a boiling point at or below the boiling point of water, utilizable as one of the components in the present solvent composition is preferably selected from the low molecular weight alcohols and ketones, such as methyl alcohol, normal propyl alcohol and isopropyl alcohol, acetone and methylethyl ketone, methanol generally being the preferred constituent for a ternary solvent composition containing adiponitrile, water and said methanol. Solvent compositions particularly useful and advantageous in the present separation process are those containing from 0.1% to about 20% by weight of water, and from about 15 to about 40% by weight of methanol, with the remainder of the composition consisting of adiponitrile. For the latter solvent composition it has been found that the selectivity of the solvent for butylene in a butane-butylene separation decreases as the water content increases, while the selectivity for butadiene in a butylene-butadiene separation increases as the water content increases. This correlation of selectivity with water content is illustrated by the data in the following Table I:

TABLE I

| Water Content of Solvent, wt. percent | Selectivity [1] | |
|---|---|---|
| | $C_4H_8/C_4H_{10}$ | $C_4H_6/C_4H_8$ |
| 2.01 | 1.90 | 1.58 |
| 4.67 | 1.56 | 1.74 |
| 10.42 | 1.50 | 1.77 |

[1] Distribution ratio of more soluble component between solvent and raffinate phases, divided by similar ratio for less soluble component.

As the water content of the solvent composition increases further, however, the total solubility of hydrocarbon in the solvent decreases and above about 20% by weight of water, the resulting solvent composition does not dissolve sufficient hydrocarbon solute to provide a practical system of separation. For most dehydrogenation processes within the scope of the present invention wherein an aliphatic paraffin is utilized as the initial charge stock and an intermediate mono-olefin is segregated from the products of the first dehydrogenation reaction stage, it is preferred to utilize a solvent composition containing from 0 to about 5% by weight of water for separating the mono-olefin intermediate and to utilize a composition containing from about 5% to about 20% by weight of water in the composition utilized to separate the di-olefin product from the mono-olefin intermediate in the second stage solvent extraction.

In the use of the preferred ternary solvent compositions containing adiponitrile, water and an organic, oxygen-containing, water-soluble compound having a boiling point at or below the boiling point of water, the extraction stage of the process is operated at temperatures of from about 90° to about 180° F., sufficient pressure being impressed on the system to maintain the feed stock and solvent composition substantially in liquid phase during the extraction. The latter extraction is desirably conducted under countercurrent flow conditions with the solvent (being the denser of the two phases) being introduced into the upper portion of the extraction column, while the hydrocarbon feed stock mixture is introduced into the mid-portion or lower portion of the extraction column and allowed to flow upwardly against a descending stream of the solvent composition. The resulting countercurrent contact between the solvent and feed stock produces a rich solvent stream containing a major proportion of the hydrocarbon feed stock component having the greatest degree of unsaturation dissolved in the solvent, the latter rich solvent being withdrawn from the lower portion of the extraction vessel and removed to a suitable recovery section wherein the hydrocarbon solute is separated from the rich solvent stream. A hydrocarbon raffinate stream, comprising predominantly the hydrocarbon component or components of relatively saturated structure, being the least preferentially soluble feed stock components, is generally removed from the top of the extraction vessel for recycle to the dehydrogenation reactor, which comprises an integral stage in the process of the present invention.

One of the most convenient methods of recovering the relatively unsaturated constituent of the feed stock from the rich solvent stream is the method referred to as "stripping" wherein the hydrocarbon solute is extractively distilled from the rich solvent to produce a vapor overhead comprising the relatively unsaturated component of the feed stock and a lean solvent residue for recycle as solvent to the extraction unit. The vapor overhead from the latter stripping column may be the ultimate product or it may represent an intermediate in the ultimate dehydrogenation of a hydrocarbon to a diene, depending upon the composition of the feed stock and the objective of the present combined process. Thus, in the separation of an olefin from a paraffin, the olefin thus recovered as overhead from the stripping column may be subjected to further dehydrogenation (for example, by diverting the stream to a dehydrogenation unit designed to effect further dehydrogenation of the olefin), or the recovered olefin may be the desired end product of the process.

In the operation of the stripping column it is desirable to effect the distillation of the hydrocarbon solute from the rich solvent stream at temperatures of from about 150° to about 220° F.; that is, at or near the boiling point of the solvent composition, which may be reduced somewhat by lowering the ambient pressure on the rich solvent stream charged to the stripping column. In order to maintain the boiling point of the solvent composition in the range indicated, say at a boiling point of about 170° F., the composition of the ternary solvent composition containing water, adiponitrile and methanol may be adjusted within certain general limits, as indicated in the following Table II:

TABLE II

*Composition of ternary solvent composition to provide a solvent having a boiling point of about 170° F.*

| Water, Wt. Percent | Adiponitrile, Wt. Percent | Methanol, Wt. Percent |
|---|---|---|
| 0 | 80.6 | 19.4 |
| 2.01 | 77.01 | 20.98 |
| 4.67 | 71.39 | 23.94 |
| 10.42 | 58.33 | 31.25 |

Thus, in order to provide a step-wise process for dehydrogenation of a paraffin or naphthene to an ultimate product consisting predominantly of the diene of the same number of carbon atoms, as exemplified by the above data for the dehydrogenation of butane to butadiene, in order to take advantage of the optimum extraction and recovery conditions in a two-stage solvent extraction process from one of which butene is recovered from a mixture of butane and butene and in the other of which butadiene is recovered from a mixture of butene and butadiene, the solvent composition must contain a relatively low proportion of water within the range of 0 to 15% in the first stage of the process (that is, the recovery of butene from butane) and a relatively high proportion of water in the second stage of the process (that is, the recovery of the butadiene from the butene). Through such adjustment of the water content of the solvent composition a process capable of operating at optimum separating conditions, greatest efficiency and greatest economy is thereby obtained, because of the selectivity relationships of the solvent for the more unsaturated component of the feed mixture varying with the water content of the solvent composition.

Because of the aforementioned adjustment in the water content of the solvent composition to correspond to the selectivity requirements of the particular feed stream charged to the extraction unit, it is apparent that the adiponitrile/methanol ratio must be varied in order to provide a solvent composition which boils at the desired stripping temperature. In the preferred embodiment of the process wherein butane is dehydrogenated to butylene, the resulting mixture is subjected to solvent extraction to recover the butene and the recovered butene further dehydrogenated to butadiene, followed by solvent extraction of the butadiene-butene mixture, it is desirable to operate both of the extraction stages at substantially the same temperature and, furthermore to effect stripping of the more unsaturated component from the rich solvent stream in each section at substantially the same temperature. Utilizing the latter indicated procedure, the degree of heating and cooling the solvent streams between each of the two stages, usually encountered in most two-stage solvent extraction processes, is thereby minimized resulting in maximum economy in heating, cooling and pumping utilities.

The process of the present invention is further described and technical factors concerning the operation of the process as referred to in greater detail in the accompanying drawing and the description pertaining thereto. Referring to the drawing, a saturated hydrocarbon-containing feed stock which may be a paraffin or naphthene containing from 4 to 6 carbon atoms per molecule or a mixture of the same with mono-olefins and/or other hydrocarbons is charged into the process flow through line 1 in amounts controlled by valve 2, the hydrocarbon or mixture of hydrocarbons being passed by line 4 through heat exchanger 5 wherein the temperature of the hydrocarbon feed stock is raised to the level desired for the dehydrogenation reaction effected in subsequent stages of the process, that is, in reactor 6 to which the heated feed stock is supplied by means of compressor 3. Dehydrogenation of saturated hydrocarbons to produce mono-olefins and di-olefins may be effected by thermal means wherein the mixture is heated to a temperature of from about 400 to about 600° C. and maintained at the latter temperature until equilibrium has been established between the hydrogenation, dehydrogenation and cracking reactions which take place at the above temperatures. Preferably, however, the dehydrogenation of saturated hydrocarbons is effected in the presence of certain catalytic agents which promote the reaction, hasten the attainment of equilibrium and in general, reduce the relative extent of the cracking reaction taking place in the reactor. A wide variety of catalytic agents are suitable for this purpose, being generally selected from the refractory oxides and sulfides of metals from the subgroups of groups IV, V, VI and VII as well as group VIII of the periodic table, preferably supported on an inert refractory support such as alumina, silica, charcoal, fire brick, kieselguhr and numerous other materials of generally porous, refractory properties. The preferred catalytic compositions are the alumina-supported oxides and sulfides of nickel, molybdenum, zirconium, thorium, vanadium, chromium and tungsten, especially such combinations of oxides containing from about 2% to about 30% by weight of the catalytic oxide such as molybdenum or chromium oxide or sulfide on alumina. A group of catalytic agents particularly suitable for effecting dehydrogenation reactions of paraffinic and naphthenic hydrocarbons containing from 4 to 6 carbon atoms are the iron group VIII metals which may be deposited on suitable refractory supporting metal oxides such as alumina, particularly nickel oxide or sulfide, platinum or palladium in their metallic or sulfided state deposited on alumina, which may, in addition, contain from 0.1% to about 3% by weight of one or more of the halogens, such as fluorine, or chlorine, combined with the metallic constituents of the catalyst composition to promote the activity of the catalyst. Dehydrogenation of the present saturated feed stocks is effected by contacting the saturated hydrocarbon with the catalyst at temperatures of from about 450° to about 750° C., in the gaseous phase, the operating pressure being maintained within the range of from subatmospheric (of the order of 300 mm. Hg absolute) to superatmospheric of the order of 30 atmospheres or more. The feed stock is passed over the catalyst at a gaseous hourly space velocity (defined as the volume of gaseous feed contacted with a unit volume of the catalyst per hour) of from about 10 to about 5000 volumes per hour per volume. The time of contact of the feed stock with the catalyst may range from 0.01 minute to about 15 minutes, depending upon the desired approach to equilibrium conditions. The catalyst may be retained within the dehydrogenation reactor in a fixed, fluidized or moving bed arrangement known to the art, the preferred method being the fixed bed method of contact wherein the gaseous feed is passed through a stationary mass of the catalyst maintained in a porous state by suitable spacing means. Thus, in the preferred process for dehydrogenation of a butane-containing feed stock, the charge is passed at a temperature of, for example, 600° C. at a gaseous hourly space velocity of 1200 and at atmospheric pressure through a stationary bed of alumina-chromia catalyst containing 8% chromia deposited upon alumina, the charge stock being passed through a vertical bed of the catalyst maintained, for example, in a vertical, tubular dehydrogenation reactor, such as reaction vessel 6 illustrated in the accompanying diagram. The products of the first dehydrogenation reaction are removed from the end of the reactor opposite to the feed stock inlet, for example, through line 7. The dehydrogenation effluent of zone 6 is thereafter pumped at a pressure of from 1 to about 30 atmospheres by means of compressor 8 through heat exchanger 9 wherein the gases are cooled to a temperature at which they liquefy at the pressure provided by pump 8, preferably to a temperature of from about 30° to about 150° C., and thereby provide a liquid paraffin-olefin stream suitable for liquid-liquid contact in extraction column 10 with the solvent.

As heretofore indicated, a suitable solvent composition for the butane-butylene separation is one containing adiponitrile, an organic, oxygen-containing compound soluble in water and in which the water content is relatively low, preferably not greater than 5% by weight of the entire solvent composition, in order to maintain the selectivity of the solvent for the olefinic component of the olefin-saturated hydrocarbon mixture comprising the dehydrogenation product at its highest level. In starting the process and for purposes of replacing the solvent losses, the solvent composition is charged into olefin extraction unit 10 through line 11 in amounts controlled by valve 12 from solvent storage or make-up supply, the solvent thereafter flowing into unit 10 by connection with line 13 which empties into the upper portion of extraction column 10. The olefin-containing initial dehydrogenation product is charged into extraction column 10 below the point of the solvent inlet, and preferably into approximately the mid-portion of the column, in order to provide an arrangement suitable for upward flow of the hydrocarbon feed in countercurrent relationship to the downwardly flowing solvent composition of generally greater density. For the recory of butylenes from a mixed butane-butene dehydrogenation product, extraction column 10 is desirably operated at a temperature of from about 90° to about 150° F., utilizing solvent-to-feed volume ratios (on a liquid charge basis) of from about 1 to 1 to about 25 to 1. Although it is to be understood that the feed may be introduced into extraction zone 10 in either liquid or vapor state, the liquid state is preferred, and the extractor is operated preferably under sufficient pressure to maintain the hydrocarbons in substantially liquid phase. As previously indicated, the solvent composition preferentially extracts the olefinic component of the feed stock, leaving the paraffin component of the feed relatively unabsorbed, the paraffins thus tending to accumulate in a raffinate stream which is removed from the upper portion of the column 10 through line 14 and valve 15. The non-extracted paraffin raffinate provides a desirable recycle stream to the dehydrogenation reactor 6 whereby the yield of olefin extract recovered from a given charge of the feed stock to the process may be enhanced. Thus, in the preferred mode of operation the paraffin raffinate removed from extraction column 10 through line 14 is recycled by means of pump 16 to paraffin charge line 1, being thereafter mixed with additional feed stock and charged into dehydrogenation reactor 6.

As the selective solvent descends through column 10 preferentially dissolving the olefinic components from the dehydrogenation reactor effluent, the resulting rich solvent stream becomes progressively richer in olefinic component and leaner in paraffinic solute. The resulting rich solvent stream is removed from the lowermost portion of column 10 through line 17 and transferred by means of pump 18 into line 19, through valve 20, into a suitable olefin recovery unit, which in the present instance, is a stripping or extractive distillation column wherein the dissolved olefinic hydrocarbon solute is vaporized in the presence of the solvent from the rich solvent stream formed in the preceding extraction column. This column, referred to as olefin stripper 21, is fashioned in the form of a distillation column having a reboiler coil 22 in the bottom portion thereof for vaporizing the olefin solute from the rich solvent supplied to the column as aforesaid by the introduction of heat into the rich solvent in contact with the reboiler. In a preferred form of the apparatus, the rich solvent is charged into stripping column 21 at a point approximately in the mid-portion thereof in order to provide extractive distillation in the upper portion of the column wherein the vaporized olefin contacts solvent vapors distilled from the rich solvent stream in the lower portion of the column. In the use of the preferred solvents containing a small proportion of water, stripping column 21 is operated at or only slightly below the boiling point of water, such that the overhead vapors released from the rich solvent stream in column 21 contain a substantial proportion of water vapor, as well as the vaporized olefins and may include a portion of the most volatile organic solvent component. These vapors are removed as an overhead vapor stream from column 21 through line 23, liquefied in condenser 24 and the condensed liquid run into receiver vessel 25 through line 26. Receiver 25 also provides a settling vessel to separate liquid olefin from an immiscible water layer which forms as a lower layer in the bottom of vessel 25. The latter material which may include a proportion of the organic constituents of the solvent composition are removed from the receiver and preferably recycled to extraction column 10 by discharge into solvent recycle line 13 through line 27, valve 28 and pump 28a. The major portion of the solvent recycle is recovered from the bottom of column 21 through line 29 and valve 30 and returned to extractor 10 through line 13 by means of pump 31.

In an alternative type of operation, not illustrated, however, stripping may be effected in column 21 by injection of steam (which may be superheated) into the lower portion of column 21, for example, above or below reboiler 22. A suitable and very desirable source of steam for this purpose may comprise at least in part, the aqueous layer drained from receiver vessel 25 through line 27.

The upper hydrocarbon layer formed in receiver vessel 25 comprises the olefin extract recovered from the rich solvent stream in stripping column 21, the olefin hydrocarbon layer being substantially exclusively olefinic, due to the selective capacity of the solvent for the olefinic constituent of the dehydrogenation product. Part of this olefinic extract may be returned as reflux to extractor column 10 via line 77, valve 78, and pump 79, being introduced into the extractor at a point below that at which the extractor feed flowing through line 7 is introduced.

The resulting olefin may be utilized as the principal product of the process or in the embodiment of the process herein provided, for the ultimate production of a diene product having the corresponding number of carbon atoms, the mono-olefin may be subjected to further dehydrogenation to form said dienic hydrocarbon. For this purpose, the primary olefin product is withdrawn from receiver vessel 25 through line 32 and valve 33 by means of pump 34, and subjected to further dehydrogenation in a secondary dehydrogenation reactor, the olefin being heated to the desired dehydrogenation temperature in heat exchanger 35. In the dehydrogenation of mono-olefins to dienes, as for example, in the conversion of butenes to butadiene, the catalyst and general reaction conditions hereinabove specified for paraffin dehydrogenation are generally also utilizable for further dehydrogenation of the olefin product of the initial conversion to the diene. Thus, temperatures of from about 350 to about 750° C. and pressures of from subatmospheric to about 10 atmospheres, gaseous hourly space velocities (for a catalyzed type of dehydrogenation reaction) of from about 0.5 to about 5000 and contact periods with the catalyst of up to 2 hours may be employed in the conversion of the olefin extract of the first dehydrogenation reaction into a diene. The olefin stream recovered from the primary dehydrogenation product at the above temperature and pressure reaction conditions is removed from heat exchanger 35 through line 36 and discharged into the second stage dehydrogenation reactor 37 for further conversion of the olefins into dienic hydrocarbons. The resulting product, comprising a mixture of mono-olefins and dienes in or near equilibrium concentrations is removed from reactor 37 through line 38 and transferred by means of pump 39 into line 40 and through valve 41, which controls the rate of discharge of the olefin-diene mixture into solvent extraction column 42. The latter extraction vessel is preferably in the form of a countercurrent, gas-liquid or preferably liquid-liquid contact apparatus into which a solvent selective for dienes is charged in order to recover the desired diene end-product from the mono-olefin-diene mixture. In order to insure liquid-liquid phase extraction in column 42, a heat exchanger or cooler, not shown in the accompanying diagram, may be inserted in line 38 in order to substantially liquefy the hydrocarbon discharge from column 37 prior to its entry into extractor 42. As heretofore specified, the solvent herein provided contains a relatively large proportion of water in admixture with adiponitrile and an organic compound soluble in water and boiling at or below the boiling point of water, such as the preferred methanol solvent constituent. For the recovery of butadiene from a mixture of butene and butadiene the concentration of water in the solvent charged to extraction unit 42 is preferably at least 5%, up to about 20% and desirably, up to about 15% by weight of the solvent composition, the solvent of this composition being charged initially into the process from make-up supplies through line 43 and valve 44 from a suitable supply source. The solvent thereafter flows into solvent supply line 45 which discharges the lean solvent composition into the upper portion of diene extraction column 42. The mixed diene-mono-olefin feed stock formed in the second stage dehydrogenation reactor is charged into extractor 42 through line 40 being preferably introduced into the extraction column in the middle or lower portion thereof in order to provide adequate countercurrent contact with the solvent in its upward flow against the downwardly flowing solvent stream. The unextracted hydrocarbon residue which contacts the lean solvent in the top of extraction column 42 is removed as a raffinate stream through line 46 and consists predominantly of the mono-olefin component of the diene-mono-olefin mixture least soluble in the solvent extractant charged to extractor 42. Since the mono-olefin raffinate may be further dehydrogenated to increase the yield of diene therefrom, it is preferably recycled directly to the second stage dehydrogenation unit for further conversion into the diene product, pump 47 which connects line 46 to line 48 being provided for transfer of the recycle stream into mono-olefin feed line 32. Valve 49 in line 48 controls the amount of mono-olefin thus recycled.

The relatively more dense rich solvent phase formed in diene extractor 42 as a result of preferential solubility of the diene in the selective solvent composition supplied thereto accumulates in the lower portion of vessel 42 and is removed therefrom for the recovery of the diene solute by extractive distillation means. For this purpose, the rich solvent stream is transferred by means of pump 52, through line 53 into diene stripping column 54 wherein the diolefinic hydrocarbon solute in the rich solvent stream is vaporized from the rich solvent by heat supplied to the lower portion of the column through reboiler 55. The rich solvent stream is desirably charged into stripper 54 at or below the mid-point of the column in order to provide a countercurrent extractive distillation effect of the solvent flowing downwardly against a rising stream of mixed solvent-diene vapors formed in stripper 54. The vapors distilled overhead from the stripper comprise a mixture of vaporized solvent, generally predominating in the lowest boiling constituent of the composition, such as methyl alcohol and water and the diene hydrocarbon product, the vapor overhead being removed from the top of column 54 through line 56 and liquefied in condenser 57 from which the liquid condensate is drained through line 58 into receiver 59. The diene product may be withdrawn from the process through line 59a in amounts controlled by valve 59b. Phase separation between the condensed vapors of aqueous solvent and dienic hydrocarbon occurs in receiver 59, the lower aqueous solvent layer being withdrawn therefrom by means of pump 60 through line 61 and valve 61a and mixed with the recycle lean solvent in line 45, thereby reconstituting the lean solvent to the selective composition utilized in the extraction column. Although not illustrated in the accompanying diagram, one of the preferred means of stripping the hydrocarbon solute from the rich solvent stream is by injecting steam into stripper 42, for example, above or below reboiler 55 and a preferred source of said steam is the aqueous phase withdrawn from receiver vessel 59.

The solvent residue from which the diene hydrocarbon has been substantially completely removed by vaporization with the aid of heat introduced through reboiler 55 accumulates in the lower portion of diene stripper 54, being removed therefrom through line 62 and valve 63 and transferred into lean solvent recycle line 45 by means of pump 64. A portion of the dienic extract may be recycled by withdrawing such portion from line 59a through line 65, valve 66 and pump 67 to the diene extractor 42, being introduced through line 68 at a point below feed introduction line 40, to serve as extractor reflux and increase the purity of the dienic extract.

In a preferred method of operating either or both the olefin extraction stage and the di-olefin extraction stage of the present process, extraction column 10 and/or extraction column 42 may be operated at a relatively high pressure, say at a slightly superatmospheric pressure, followed by stripping the resulting rich solvent streams formed in either or both extraction column 10 or extraction column 42 at a lower pressure, as for example, at a subatmosphere pressure, stripping of the rich solvent being effected in either olefin stripper 21 or diene stripper 54, it being thereby possible to effect both the extraction and stripping stages at substantially the same temperature (isothermal operation) and effecting vaporization of the hydrocarbon solute from the rich solvent stream merely by pressure reduction. By means of the latter type of operation substantially greater conservation of heat required by the entire system may be effected.

One of the preferred simplified methods of operating the present process to produce a substantially pure di-olefinic hydrocarbon product comprises effecting the initial dehydrogenation of the saturated hydrocarbon charge stock at relatively severe dehydrogenation conditions to form an effluent containing a substantial proportion of di-olefin in the first stage dehydrogenation reaction, subjecting the resulting mixture of unconverted saturated hydrocarbon, mono-olefin and di-olefin to solvent extraction under conditions whereby a rich solvent stream containing substantially all of the di-olefins formed is separated from the extractor, thereafter stripping the rich solvent stream to vaporize a relatively more volatile fraction comprising unconverted paraffin and mono-olefin and further volatilizing at a higher temperature the di-olefin product which is relatively less volatile in the presence of a solvent, recycling the more volatile paraffin-mono-olefin fraction to the extraction zone as a reflux fraction and separately collecting the vaporized di-olefin from the stripping column. The operating characteristics of such a process depend upon the relatively greater solubility of the di-olefin hydrocarbon in the solvent composition and the relatively higher vaporization temperature for the di-olefin in the stripping column. This preferred, alternative type of operation is illustrated in the accompanying diagram. Thus, the mixture of mono-olefin, di-olefin and unconverted paraffin charge stock formed in the first stage dehydrogenation reactor 6 is charged into olefin extractor 10 by means of pump 9, the solvent being introduced into the upper portion of the column through line 13. The raffinate in this type of operation, which is withdrawn from the top of extraction zone 10 through line 14 comprises unconverted paraffin and mono-olefin intermediate dehydrogenation product. The rich solvent which is withdrawn from the bottom of extraction zone 10 through line 17 is charged by means of pump 18 into line 19 which conveys the rich solvent into olefin stripping column 21, the rich solvent containing all of the di-olefin present in the dehydrogenated product as well as a small proportion of the paraffin and mono-olefin which are soluble to a limited extent in the solvent composition. As indicated, the solvent affects the boiling point of the paraffin constituent of the dissolved hydrocarbons least, raises the boiling point of the mono-olefin constituent of the hydrocarbon solute slightly and raises the boiling point of the di-olefin constituent of the mixed dehydrogenation product to the greatest extent. Hence, the most volatile fraction vaporized from the rich solvent by virtue of heat introduced through reboiler coil 22 and which is removed from the top of stripping column 21 through line 23, condensed in heat exchanger 24, and collected in receiver vessel 25 contains all of the paraffin and mono-olefin constituents of the hydrocarbon solute, but because of the partial pressure of the di-olefin, a portion of di-olefin solute also vaporizes in the overhead fraction. The temperature and rate of withdrawing the overhead vapor is controlled in order to obtain substantially complete vaporization of the paraffin and mono-olefin constituents of the hydrocarbon solute into the overhead stream. The mixed solvent residue after vaporization of the paraffin and mono-olefin solute therefrom is further reboiled in order to vaporize the remaining di-olefin solute. The latter, together with volatilized solvent components is removed in a separate stream from column 21 through line 69 and valve 70, condensed in heat exchanger 71 and the liquid condensate collected in receiver vessel 72. The volatilized solvent components which are relatively more dense than the vaporized hydrocarbon components are withdrawn from receiver vessel 72 through line 73 in amounts controlled by valve 74 and mixed with recycle solvent in line 13 to reconstitute the solvent composition. The di-olefin product which accumulates in an upper layer in receiver 72 is removed as substantially pure di-olefin product through line 75 and valve 76 into storage or other disposition.

In the present alternative embodiment of the process wherein the mono-olefin and unconverted paraffin are vaporized from the stripping column in a separate overhead vapor fraction, the latter stream is removed from line 32 by closing valve 33, through line 77 and valve 78 and transferred by means of pump 79 into the lower portion of extraction column 10 as a reflux stream therein to take advantage of the selective displacement action of mono-olefins on the paraffin component of the rich solvent by virtue of the selective solubility of olefins over paraffins in the solvent composition. By virtue of the preferential solubility of olefins over paraffins and the still greater solubility of di-olefins over mono-olefins in the solvent, the reflux fraction which contains a substantial proportion of vaporized di-olefins displaces the paraffin and mono-olefin constituents from the rich solvent stream just prior to removal of the latter stream from the extraction zone, thereby reducing the reboiler load on the olefin stripper in order to remove all of the mono-olefin and paraffin solute from the rich solvent prior to vaporization of the di-olefin therefrom. In order to obtain maximum countercurrent contact with the rich solvent stream, the reflux fraction is thus introduced into the lower portion of extraction column 10 and allowed to flow upwardly against the descending stream of rich solvent, the di-olefin dissolving in the rich solvent after displacement of a major portion of the paraffin and mono-olefin solute which combines with the raffinate for recycle to the dehydrogenation zone.

The present invention is further illustrated with respect to a specific charging stock, solvent and operating conditions in the following example which is introduced merely for illustrative purposes with no intention of thereby limiting the scope of the invention necessarily in accordance therewith.

EXAMPLE

A predominantly normal butane fraction containing at least 95% normal butane, from 1 to 4% butenes and no more than 1% of other impurities such as $C_3$ and $C_5$ hydrocarbons was separated from the products of a petroleum cracking process and utilized as feed stock in a butane dehydrogenation reaction, followed by extraction of the resultant dehydrogenated product, stripping the rich solvent phase recovered therefrom and recycling of the butane-butylene raffinate to the dehydrogenation reaction. The dehydrogenation reactor was of the fluidized catalytic type into which the predominantly n-butane charge stock was introduced at a rate of 2200 gaseous hourly space velocity, at a temperature of 700° C. and at a partial pressure of $C_4$ hydrocarbons of 0.75 atmosphere (the partial pressure being reduced below atmospheric by mixing steam with the charge stock). The catalyst is an alumina-chromia composite containing approximately 8% by weight of $Cr_2O_3$ composited with the activated alumina. A recycle stream consisting primarily of a butane-butylene mixture and recovered from the solvent extraction vessel, as hereinafter indicated, is charged into the bottom of the dehydrogenation reactor at a rate of 1500 gaseous hourly space velocity wherein it is mixed with the gaseous fresh feed to the unit. The products of the dehydrogenation reaction are cooled to approximately 170° F. and charged into the mid-point of a vertical countercurrent absorption column into which a solvent mixture consisting of 77% adiponitrile, 21% methanol and 2% water was charged into the upper end of the column at a rate sufficient to provide a volumetric solvent to fresh feed ratio of 12 to 1. Analysis of the feed stock to the extraction column indicates that it contains 36.7% butadiene-1,3, 30.1% of butene-2 and 33.2% by weight of unconverted n-butane.

A recycle fraction separated from the stripping column, hereinafter described, and comprising a mixture of n-butane, butene-2 and butadiene-1,3 in which the proportion of butadiene to $C_4$ paraffins and olefins is approximately 1 to 7, is charged into the bottom of the solvent extraction unit as a reflux fraction at a reflux to fresh feed ratio of 2 to 1. For the purpose of the present extraction, the butane dehydrogenation product is cooled to a temperature of 170° F., compressed, and pumped as a liquid into the solvent extraction column, which is maintained at a pressure of 250 p.s.i.g. The latter unit consists of a perforated plate solvent extraction column through which the liquefied feed rises through the perforations against the downwardly flowing solvent stream. A raffinate phase containing less than 1.5% butadiene, with the remainder comprising 47.0% butene-2 and 51.5% n-butane is recycled at the aforementioned rate to the dehydrogenation unit.

A rich solvent stream containing dissolved butadiene, and a relatively smaller proportion of butene-2 and a much smaller proportion of n-butane is charged in liquid phase into a stripping column in which extractive distillation occurs and in which the pressure is maintained at a substantially lower level than the pressure in the extraction zone to thereby effect vaporization of a volatile overhead fraction relatively rich in n-butane and relatively poor in butadiene-1,3. Heat was introduced into the lower portion of the column by means of a reboiler coil which circulated steam at a temperature of 250° F. and the overhead most volatile fraction, was taken off at a temperature of 155° F. The overhead fraction was liquefied in a water-cooled condenser, the lower aqueous phase of which was separated and the upper hydrocarbon phase recycled to the bottom of the countercurrent solvent extraction column as reflux therein in order to recover the butadiene component of the overhead and to effect selective displacement into the raffinate of the butane and butene components dissolved in the rich solvent stream. The vapor overhead stream which is utilized as reflux to the countercurrent extraction column consists of 40% butadiene, 46% butene-2 and 14% n-butane. A side-cut product fraction was removed from the stripping column approximately 1/3 of the height of the column from the point at which the rich solvent is introduced into the top of the column, the latter stream consisting of substantially pure butadiene-1,3 mixed with water and vapor. The side cut fraction is thereafter cooled and condensed to a liquid, the upper layer of butadiene-1,3 being removed to product storage while the lower aqueous layer is reserved for mixing with the lean solvent composition prior to recycle of the lean solvent to the extraction unit. The solvent residue (lean solvent) remaining after vaporization of all of the hydrocarbon solute therefrom is removed from the bottom of the stripping column, mixed with the aqueous phases separated from the vapor overhead and side cut fractions and recycled as the aforementioned solvent composition to the top of the extraction column.

Utilizing the foregoing procedure in which the n-butane and butene-2 intermediate are continuously recycled to the dehydrogenation reactor, complete conversion of the n-butane charge stock is realized, less than 10% of the charge stock being lost to coke-formation. The net product consists of substantially pure butadiene-1,3.

In a process utilizing substantially the same process flow as utilized in the foregoing conversion, it is found that a solvent consisting of 71.4% adiponitrile, 24.0% acetone, and 4.6% water was an effective selective solvent for the butadiene component of the mixture of $C_4$ hydrocarbons produced by dehydrogenation of n-butane; however, the solubility of the total hydrocarbon solute in this solvent was substantially less than in the aforementioned adiponitrile-methanol-water mixture.

We claim as our invention:

1. A process for the production of a di-olefinic hydrocarbon which comprises subjecting a more saturated hydrocarbon containing from 4 to 6 carbon atoms to dehydrogenation at reaction conditions sufficient to convert at least a portion of said more saturated hydrocarbon to a mono-olefin of the same number of carbon atoms, contacting the dehydrogenation reaction product with a solvent mixture of adiponitrile, from 0 to about 20% by weight of water and from 5 to about 30% by weight of an oxygen-containing organic compound selected from the group consisting of alcohols and ketones soluble in water and having a boiling point not substantially greater than water, separating a rich solvent from a raffinate comprising said more saturated hydrocarbon and separating said mono-olefinic hydrocarbon from the rich solvent, subjecting the thus separated mono-olefin to dehydrogenation to convert at least a portion thereof to a diene of the same number of carbon atoms, separating said diene from the resultant products by solvent extraction of the latter with a mixture of adiponitrile, water and an oxygen-containing organic compound of the group aforesaid, the last-named mixture containing a higher percentage of water than the first-mentioned solvent mixture, and recovering said diene from the enriched solvent.

2. The process of claim 1 further characterized in that solvent extractions are effected at a temperature of from about 90° to about 180° F.

3. The process of claim 1 further characterized in that said more saturated hydrocarbon is n-butane.

4. The process of claim 1 further characterized in that said more saturated hydrocarbon is a light hydrocarbon mixture containing $C_4$ hydrocarbons.

5. The process of claim 1 further characterized in that each of the solvent mixtures contains methanol as said oxygen-containing organic compound.

6. The process of claim 1 further characterized in that the first-mentioned solvent mixture contains from about 0.1% to about 5% by weight of water and the second-mentioned solvent mixture contains from about 5% to about 20% by weight of water.

7. The process of claim 6 further characterized in that each of the solvent mixtures contains methanol as said oxygen-containing organic compound.

8. The process of claim 1 further characterized in that said hydrocarbon of from 4 to 6 carbon atoms is a paraffin.

9. A process for converting a paraffinic hydrocarbon containing from 4 to 6 carbon atoms into a diene of the same carbon atom content which comprises subjecting said paraffinic hydrocarbon to a first dehydrogenation reaction at reaction conditions sufficient to convert at least a portion of the paraffin into a mono-olefin of the same carbon atom content, contacting the resulting olefin-containing hydrocarbon mixture with a solvent mixture of adiponitrile, from 0 to about 20% by weight of water and from 15% to about 40% by weight of an oxygen-containing, water-soluble organic compound selected from the group consisting of alcohols and ketones having a boiling point not substantially in excess of about 212° F., separating unconverted paraffin as raffinate from a first rich solvent stream containing dissolved mono-olefin, recovering said mono-olefin from said first rich solvent, recycling said paraffinic raffinate to the first dehydrogenation stage, subjecting said recovered mono-olefin to a second dehydrogenation at reaction conditions sufficient to convert at least a portion of said mono-olefin to said diene hydrocarbon of the same carbon atom content, contacting the resulting diene-containing hydrocarbon mixture with a second solvent mixture of adiponitrile, water and an oxygen-containing organic compound of the group aforesaid, said second solvent mixture containing a higher percentage of water than the first-mentioned solvent mixture, separating unconverted olefin as raffinate from a second rich solvent containing dissolved diene, recovering said diene from said second rich solvent and recycling said olefin to said second dehydrogenation stage.

10. The process of claim 9 further characterized in that said second solvent contains from 5 to 20% by weight of water and from 15% to about 40% by weight of methanol.

11. The process of claim 9 further characterized in that said first solvent contains from 0 to about 5% by weight of water and said second solvent contains from about 5 to about 20% by weight of water.

12. The process of claim 9 further characterized in that each of the solvent mixtures contains methanol as said oxygen-containing organic compound.

References Cited in the file of this patent

UNITED STATES PATENTS

| | | |
|---|---|---|
| 2,371,908 | Morris et al. | Mar. 20, 1945 |
| 2,433,751 | Friedman | Dec. 30, 1947 |
| 2,750,435 | Fetchin | June 12, 1956 |